US012076699B2

(12) United States Patent
Cheng et al.

(10) Patent No.: US 12,076,699 B2
(45) Date of Patent: Sep. 3, 2024

(54) INTEGRATED COMPOSITE OVERLOAD INJECTION SYSTEM AND WORKING METHOD THEREOF

(71) Applicants: SHINDA (TANGSHAN) CREATIVE OIL & GAS EQUIPMENT CO., LTD., Tangshan (CN); HEBEI HUATONG WIRES AND CABLES GROUP CO., LTD., Tangshan (CN)

(72) Inventors: Haixuan Cheng, Tangshan (CN); Mei Han, Tangshan (CN); Guangrui Dou, Tangshan (CN); Huaibing Ma, Tangshan (CN); Minghong Gai, Tangshan (CN); Zheyue Liu, Tangshan (CN); Zilong Hu, Tangshan (CN); Jianliang Duan, Tangshan (CN)

(73) Assignees: SHINDA (TANGSHAN) CREATIVE OIL & GAS EQUIPMENTCO., LTD., Tangshan (CN); HEBEI HUATONG WIRES AND CABLES GROUP CO., LTD, Tangshan (CN)

( * ) Notice: Subject to any disclaimer, the term of this patent is extended or adjusted under 35 U.S.C. 154(b) by 855 days.

(21) Appl. No.: 17/039,219

(22) Filed: Sep. 30, 2020

(65) Prior Publication Data

US 2021/0324717 A1 Oct. 21, 2021

(30) Foreign Application Priority Data

Apr. 21, 2020 (CN) ......................... 202010317486.7

(51) Int. Cl.
*E21B 43/20* (2006.01)
*B01F 7/00* (2006.01)
(Continued)

(52) U.S. Cl.
CPC .......... *B01F 33/8212* (2022.01); *B01F 21/02* (2022.01); *B01F 21/10* (2022.01);
(Continued)

(58) Field of Classification Search
CPC ........ E21B 43/16; E21B 21/062; B01F 33/83; B01F 35/31; B01F 33/8212
See application file for complete search history.

(56) References Cited

FOREIGN PATENT DOCUMENTS

CN 110026099 A * 7/2019 ............ B01F 1/0011

OTHER PUBLICATIONS

Espacenet translation of Xiu Chen (CN110026099A), published Jul. 19, 2019 (Year: 2019).*

* cited by examiner

*Primary Examiner* — Elizabeth Insler
(74) *Attorney, Agent, or Firm* — Day Pitney LLP; George Chaclas; Anthony A. Kassas

(57) ABSTRACT

The present invention discloses an integrated composite overload injection system and a working method thereof. The feeding mechanism preliminarily mixes water with a main agent and an auxiliary agent of an intelligent energy-gathered oil-displacing agent according to the ratio, the outlet of the feeding mechanism is communicated with the input port of the composite overload mechanism through a pipeline, the composite overload mechanism stirs, mixes, dissolves and overload ripens the preliminarily mixed solution to form mother solution, the mother solution is input from the output port of the composite overload mechanism to the inlet of the booster pump through a pipeline, the booster pump injects the boosted mother solution into the mixer, the mixer mixes the mother solution and the diluted high-pressure water and injects it into an oil-water well, and
(Continued)

the power shafts of the composite overload mechanism and the booster pump are both driven by the driving mechanism.

15 Claims, 3 Drawing Sheets

(51) Int. Cl.
*B01F 21/00* (2022.01)
*B01F 21/10* (2022.01)
*B01F 27/19* (2022.01)
*B01F 33/82* (2022.01)

(52) U.S. Cl.
CPC ............ *B01F 21/503* (2022.01); *B01F 27/19* (2022.01); *B01F 33/821* (2022.01)

INTEGRATED COMPOSITE OVERLOAD INJECTION SYSTEM AND WORKING METHOD THEREOF

CROSS REFERENCE TO RELATED APPLICATION

This application claims priority of Chinese Patent Application No. 202010317486.7, entitled "Integrated Composite Overload Injection System and Working Method Thereof" filed with the China National Intellectual Property Administration on Apr. 21, 2020, which is incorporated herein by reference in its entirety.

TECHNICAL FIELD

The present invention relates to the technical field of a petrochemical device, in particular to an integrated composite overload injection system and a working method thereof.

BACKGROUND

The original technology for preparing, dissolving and ripening the injection agent for onshore tertiary oil recovery and intelligent energy-gathered oil-displacing has a long process, many devices and a large occupied area. If a high-concentration mother solution of 50 $m^3$ is prepared per day, the occupied area is more than 200 $m^2$, and if a mother solution of several hundred $m^3$/d is prepared, the occupied area is larger. It is long in process, large in the number of devices, large in the number of installation sets, large in power consumption, and difficult in management and maintenance. There is a problem of a large occupied area and a large site.

In the prior art, the injection process of the intelligent energy-gathered oil-displacing agent in the oilfield injection system is shown in FIG. 1. The intelligent energy-gathered oil-displacing agent solution is prepared as follows: the intelligent energy-gathered oil-displacing agent in the intelligent energy-gathered oil-displacing agent hopper 2' and the high-pressure water supplied from the water inlet valve 1' are fed into the solid-liquid mixer 3' according to the ratio for preliminary mixing and dispersion, and then are output to the buffer tank 4' to be stirred for 1-4 hours so that the intelligent energy-gathered oil-displacing agent is evenly dispersed to the water. The solvent does not form agglomerates and no fish eyes appear, so as to prepare a high-concentration mixed mother solution.

The mother solution storage and ripening: the mixed mother solution is fed to the ripening tank 5' for ripening. The molecules of the intelligent energy-gathered oil-displacing agent are in a clump structure, which gradually swells in an aqueous solution, and the viscosity of the solution rises. It is not easy for the swollen solution to block the oil layer. The ripening time of the intelligent energy-gathered oil-displacing agent solution is generally set to 18-240 h. The ripening tank 5' is large in occupied area and space, long in ripening time and low in efficiency.

Dilution, pump injection: the concentration of the mother solution is generally 5000 mg/L. After ripening, the mother solution needs to be diluted and injected into the oil layer below the wellhead device 7' using the booster pump 6'. The dilution water is generally sewage. The booster pump 6' is a plunger pump, and its displacement is generally not more than 200 $m^3$/d. When solid-phase particles are specially added to the plunger pump, the maintenance period of the pump valve and high-pressure sealing packing is generally short.

Offshore oil fields are exploited by offshore platforms. In order to reduce the cost of exploitation, there are usually ten to dozens of oil-water wells on the platform, which are characterized by narrow platform space. Generally, there are problems that the multi-well production operation cannot be carried out at the same time and the single-well production operation can only be implemented; the production requires that the technical measure device occupies an area of not more than 30 $m^3$; the injection volume is large, and the water injection wells in offshore oilfields are mostly horizontal wells. Hundreds to thousands of square meters of water are injected for a single well, and the injection equipment process will occupy a larger area; it is difficult in transportation, installation, maintenance of material and equipment, high in labor cost and poor in environment; it is corrosive in marine typhoon environment, high in construction and maintenance cost of supporting facilities, etc.

Therefore, the oilfield injection system in the prior art is long in process, large in the number of devices, large in the number of installation sets, large in occupied area and space, long in ripening time, low in efficiency, large in power consumption, and difficult in management and maintenance. It cannot be applied to the needs of offshore oilfield platforms with small area and limited installation space or other oil production occasions with limited installation space. Therefore, it is necessary to develop an integrated composite overload injection system.

SUMMARY

The object of the present invention is to provide an integrated composite overload injection system and a method thereof, the occupied area and space of the device are greatly reduced, the dispersing, dissolving and ripening time of preparing the intelligent energy-gathered oil-displacing agent is greatly shortened, and the injection efficiency is improved.

In order to solve the above technical problems, the present invention uses the following technical solutions.

The present invention provides an integrated composite overload injection system, comprising a feeding mechanism, a composite overload mechanism, a driving mechanism, a booster pump and a mixer, which are provided on a rack, wherein the feeding mechanism preliminarily mixes water with a main agent and an auxiliary agent of an intelligent energy-gathered oil-displacing agent according to the ratio, the outlet of the feeding mechanism is communicated with the input port of the composite overload mechanism through a pipeline, the composite overload mechanism stirs, mixes, dissolves and overload ripens the preliminarily mixed solution to form mother solution, the mother solution is input from the output port of the composite overload mechanism to the inlet of the booster pump through a pipeline, the booster pump injects the boosted mother solution into the mixer, the mixer mixes the mother solution and the diluted high-pressure water and injects it into an oil-water well, and the power shafts of the composite overload mechanism and the booster pump are both driven by the driving mechanism.

Further, the composite overload mechanism comprises a stator barrel and a rotor, the mandrel of the rotor is hermetically supported in the stator barrel by the bearing seats at both ends, an impeller set and an overload bed are provided on the mandrel, a spacer ring for sealing isolation is provided in the middle of the stator barrel, the spacer ring isolates the impeller set and the overload bed and divides the stator barrel into a stirring chamber and an overload chamber, the inner wall of the stator barrel in the stirring chamber is provided with a baffle ring and a baffle plate for water hammer; the stator barrel is provided with the input port for feeding on the side wall of the stirring chamber, the stator barrel is provided with the output port for discharging on the side wall of the overload chamber, the mandrel is provided with a mandrel communication hole group for connecting the stirring chamber and the overload chamber at one end of the stator barrel, and one end of the mandrel protruding out of the stator barrel is a power shaft.

Further, an annular groove is provided in the middle of the bearing seat outside the stirring chamber, the input port corresponds to the annular groove, and the bottom of the annular groove is provided with a low-pressure area input hole toward the stirring chamber.

Further, the driving mechanism comprises a motor and a transmission unit, the motor is installed on the rack and inputs power to the input end of the transmission unit, and two output ends of the transmission unit are connected to the power shafts of the composite overload mechanism and the booster pump, respectively.

Further, the transmission unit comprises a small wheel, an intermediate axle and a large wheel, the small wheel is connected with the power shaft of the composite overload mechanism and the output shaft of the motor in series and coaxially, the intermediate axle is erected above the rack through a bearing seat, the small wheel and the large wheel are both connected to the intermediate wheel of the intermediate axle through a transmission member, and the rotating shaft of the large wheel is connected to the power shaft of the booster pump through a coupling.

Further, the transmission member specifically uses a transmission belt or a chain.

Further, the booster pump specifically uses a low-speed screw pump, the rotor of the low-speed screw pump changes in diameter at the high and low pressure ends, and the stator of the low-speed screw pump is connected in series in sections.

Further, the mixer specifically uses a static mixer.

Correspondingly, the present invention further provides a working method of an integrated composite overload injection system, wherein the integrated composite overload injection system according to any one of the above is used in injection of an oil-water well, and the working steps comprise:

- a first step, in which the feeding mechanism introduces a water source and an intelligent energy-gathered oil-displacing agent for preliminary mixing according to the process ratio;
- a second step, in which the preliminary mixed solution is sucked into the mixing chamber of the composite overload mechanism for water hammer stirring and mixing, and then enters into the overload chamber of the composite overload mechanism for overload quick-dissolving, ripening and filtering to form a high-viscosity and high-concentration mother solution;
- a third step, in which the mother solution is input to the inlet of the booster pump through a pipeline, and is transported and injected by the booster pump with low shear and high pressure to the mixer;
- a fourth step, in which the mixer mixes and dilutes the high-pressure dilution water and the high-pressure mother solution, and then injects it into the oil-water well.

Further, the composite overload mechanism and the booster pump are driven by two output ends of a set of driving mechanisms, and the power shaft of the booster pump has a rotating speed lower than that of the composite overload mechanism.

Compared with the prior art, the beneficial technical effects of the present invention are as follows.

The present invention provides an integrated composite overload injection system. The core device composite overload mechanism is provided, reducing from a total number of more than one hundred square of four dispersing and ripening tanks to the reactor of less than one square, in which the volume is reduced by more than one hundred times, the dissolving and ripening speed is shortened from 18 to 24 hours to less than 10 minutes, and the efficiency can be improved by one hundred times. It can realize self-priming feeding, stirring, mixing, dissolving, overload ripening and filtering. It is suitable for preparing insoluble and easy-to-shear solution. The power shafts of the composite overload mechanism and the booster pump are both driven by a set of driving mechanisms, which reduces the number of driving devices, improves the utilization efficiency of the device, and reduces power consumption. According to the integrated composite overload injection system of the present invention, the occupied area and space of the device are greatly reduced, the dispersing, dissolving and ripening time of preparing the intelligent energy-gathered oil-displacing agent is greatly shortened, and the injection efficiency is improved.

In addition, through the composite overload mechanism mainly consisted of the stator barrel and the rotor, the injected water source is mixed with a main agent and an auxiliary agent of an intelligent energy-gathered oil-displacing agent into mixed solution in the temporary storage tank. The mixed solution enters into the stirring chamber through the input port and is stirred by the impeller set at a high speed, and then enters into the overload chamber through the mandrel communication hole group for overload quick-dissolving, ripening and filtering by the overload bed. The multi-functional composite overload mechanism is highly integrated, performing high-speed water hammer stirring, macro-mixing and micro-dissolving, overload molecular infiltrating and ripening, overload bed on-line ripening, and ripening solution filtering. Compared with the prior art, the mechanism reduces the number of devices and the preparation processes, improves the preparation efficiency of mother solution, and is suitable for online real-time use. The annular groove and the low-pressure area input hole are provided, facilitating the introduction of the mixed solution introduced from the inlet port into the centrifugal low-pressure area of the stirring chamber, which is capable of forming a negative pressure for suction feeding and saves the traditional way of feeding through the jet pump. The transmission unit consists of the small wheel, the intermediate axle and the large wheel and is driven by the motor, and a single motor can be used to drive the composite overload mechanism and the booster pump at the same time, reducing equipment investment. The screw pump needs more power to start. When the system starts, the composite overload mechanism does not start and load until the screw pump starts. Using the screw pump to start the standby power can drive the composite overload mechanism, reduce the installed power, improve the system energy utilization rate, improve the utilization rate of the motor, and improve the efficiency of the motor and the system at the same time, which not only reduces the installed power but also achieves a power saving effect. Furthermore, it saves installation space. A low-speed screw pump is used. Using the round geometry of the screw pump rotor and the low-shear characteristics of the continuous motion chamber, the mother solution, which has been basically ripened, is further stirred, dissolved, ripened and pressurized; a low-speed screw pump changing in diameter at the high and low pressure ends is used so as to gradually pressurize the mother solution, which increases the service life of the device; the stator of the low-speed screw pump is connected in series in sections, which is convenient for replacement and maintenance. The replaced stator can be recycled on the rotor with a larger diameter, saving equipment cost.

BRIEF DESCRIPTION OF THE DRAWINGS

The present invention will be further described below with reference to the accompanying drawings.

Figure 1:
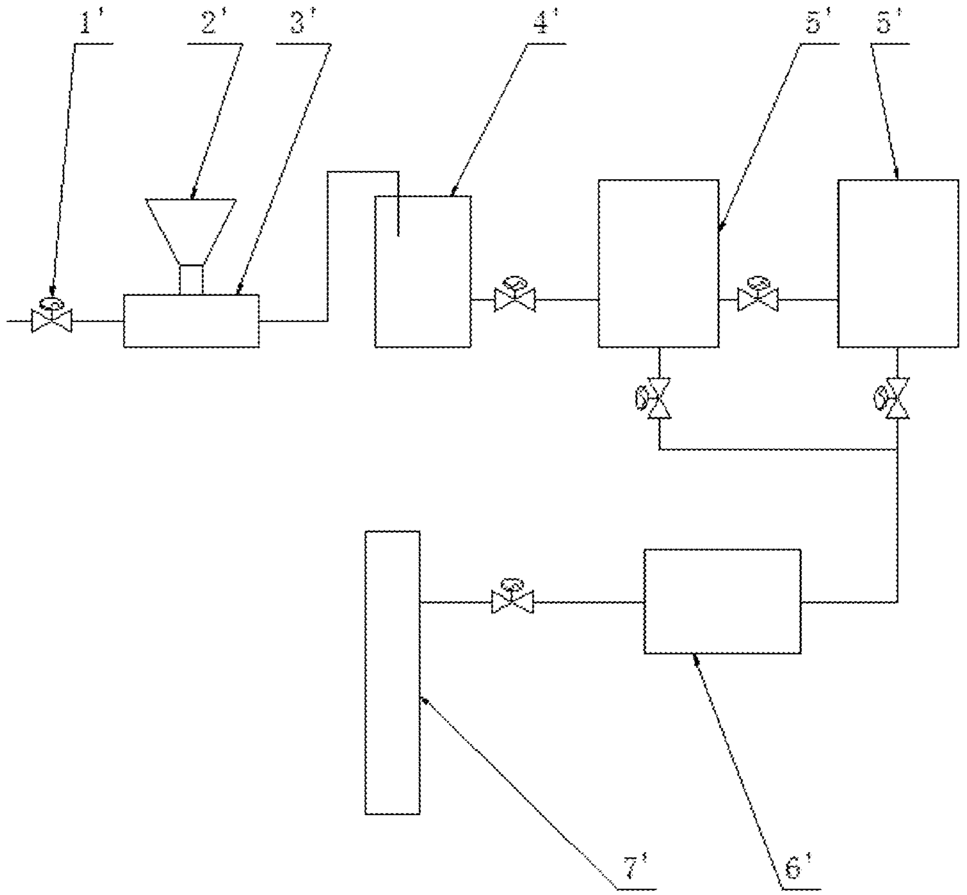
FIG. 1 (PRIOR ART)
FIG. 1 is a schematic diagram of the injection process of an intelligent energy-gathered oil-displacing agent in the oilfield injection system in the prior art.

Description of reference numerals: 1', a water inlet valve; 2', an intelligent energy-gathered oil-displacing agent hopper; 3', a solid-liquid mixer; 4', a buffer tank; 5', a ripening tank; 6', a booster pump; 7', a wellhead device;

1, a water supply valve; 2, feeding mechanism; 3, a feeding hopper; 4, a composite overload mechanism; 400, first power shaft; 401, a stator barrel; 4011, an input port; 4012, an output port; 402, a rotor; 4021, mandrel; 403, a stirring chamber; 4031, side wall; 404, an overload chamber; 4041, side wall; 405, a spacer ring; 406, an impeller set; 407, an overload bed; 408, first bearing seat; 4081, annular groove; 4082 low-pressure area input hole; 409, mandrel communication hole group; 5, a motor; 6, a small wheel; 7, an intermediate axle; 8, a large wheel; 9, a booster pump; 10, a mixer; 11, rack; 12, first pipeline; 13, second pipeline; 701, second bearing seat; 702, first transmission member; 703, second transmission member; 704, first intermediate wheel; 705, second intermediate wheel; and 901, second power shaft.

DESCRIPTION OF THE EMBODIMENTS

The core of the present invention is to provide an integrated composite overload injection system, the occupied area and space of the device are greatly reduced, the dispersing, dissolving and ripening time of preparing the intelligent energy-gathered oil-displacing agent is greatly shortened, and the injection efficiency is improved.

The technical solutions in the embodiments of the present invention will be described clearly and completely in conjunction with the drawings in the embodiments of the present invention. Obviously, the described embodiments are only a part of the embodiments of the present invention, rather than all the embodiments. Based on the embodiments of the present invention, all other embodiments obtained by those skilled in the art without paying creative efforts fall within the protection scope of the present invention.

In the description of the present invention, it should be understood that the orientation or positional relationship indicated by the terms, such as "upper", "lower", "front", "rear", "left", "right", "top", "bottom", "inner", and "outer" is based on the orientation or positional relationship shown in the drawings, which is only for the convenience of describing the present invention and simplifying the description, rather than indicating or implying that the described device or element must have a specific orientation or be constructed and operated in a specific orientation, and thus cannot be understood as a limitation of the present invention.

Figure 2:
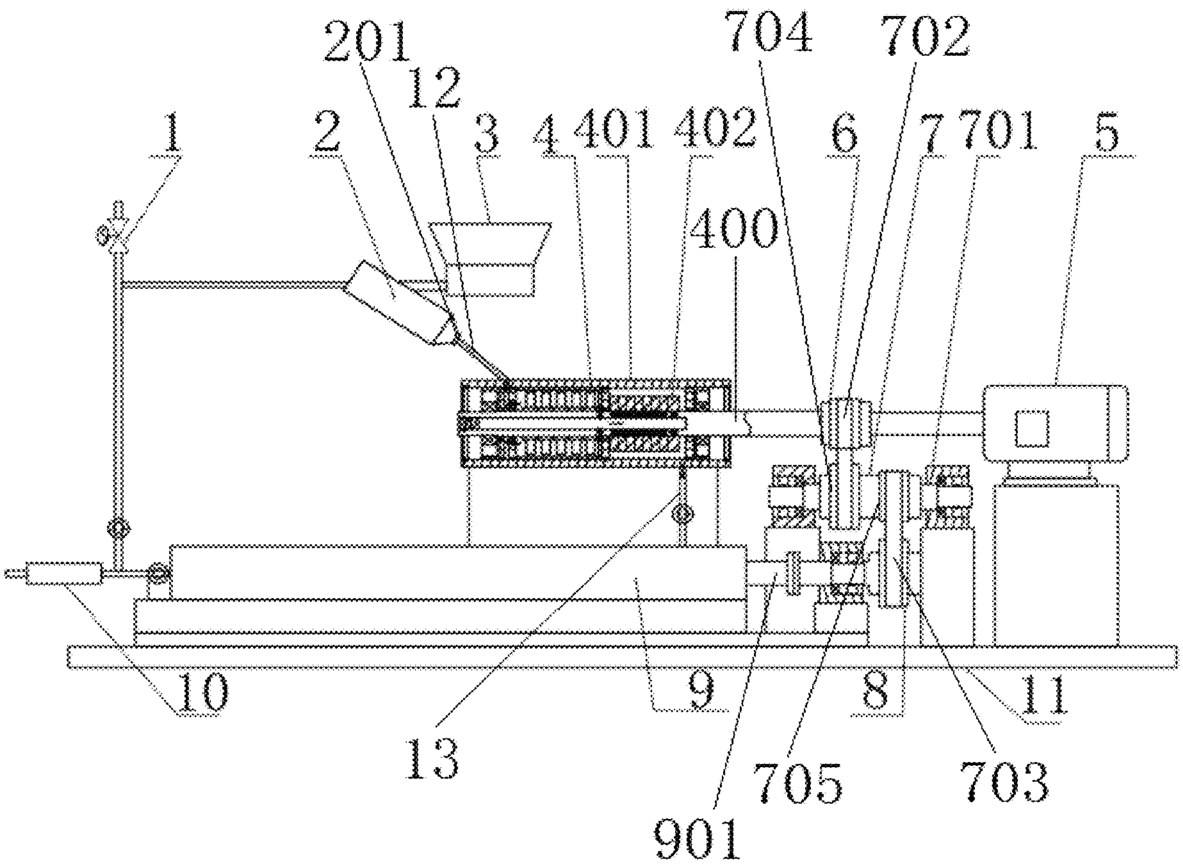
FIG. 2 is a schematic diagram of the composition of an integrated composite overload injection system according to the present invention.

Referring to the drawings, FIG. 1 is a schematic diagram of the injection process of an intelligent energy-gathered oil-displacing agent in the oilfield injection system of the prior art; FIG. 2 is a schematic diagram of the composition of an integrated composite overload injection system according to the present invention; and FIG. 3 is a schematic front cross-sectional structural diagram of a composite overload mechanism according to the present invention.

Figure 3:
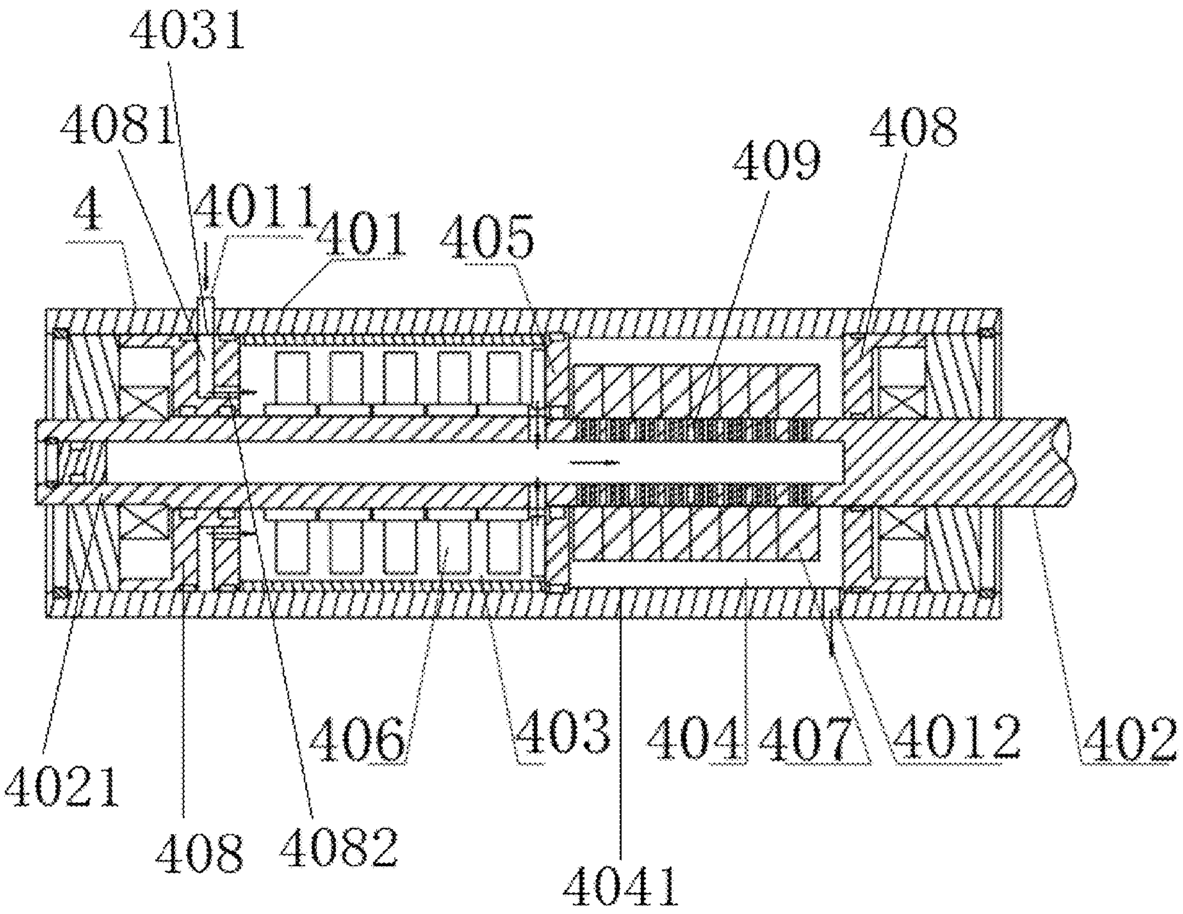
FIG. 3 is a schematic front cross-sectional structural diagram of a composite overload mechanism according to the present invention.

In a specific embodiment, as shown in FIGS. 2 and 3, an integrated composite overload injection system comprises a feeding mechanism 2, a composite overload mechanism 4, a driving mechanism, a booster pump 9 and a mixer 10, which are provided on a rack 11. The feeding mechanism is in the form of a jet tube. The inlet end at the tail of the jet tube is connected to a water source, and the inlet end of the side wall is connected to the intelligent energy-gathered oil-displacing agent conveyed by the screw conveyor below the feeding hopper 3. The outlet of the jet tube is communicated with the input port 4011 of the composite overload mechanism 4 through a first pipeline 12, the composite overload mechanism 4 stirs, mixes, dissolves and overload ripens the preliminarily mixed liquid to form mother solution, the mother solution is input from the output port 4012 of the composite overload mechanism 4 to the inlet of the booster pump 9 through a second pipeline 13, the booster pump 9 injects the boosted mother solution into the mixer 10, the mixer 10 mixes the mother solution and the diluted high-pressure water and injects it into an oil-water well, and the first power shaft 400 of the composite overload mechanism 4 and the second power shaft 901 of the booster pump 9 are both driven by the driving mechanism.

The present invention provides an integrated composite overload injection system. The core device composite overload mechanism 4 is provided, reducing from a total number of more than one hundred square of four dispersing and ripening tanks to the reactor of less than one square, in which the volume is reduced by more than one hundred times, the dissolving and ripening speed is shortened from 18 to 24 hours to less than 10 minutes, and the efficiency can be improved by one hundred times. It can realize self-priming feeding, stirring, mixing, dissolving, overload ripening and filtering. The present invention is particularly suitable for preparing insoluble and easy-to-shear solution. The power shafts of the composite overload mechanism 4 and the booster pump 9 are both driven by a set of driving mechanisms, which reduces the number of driving devices, improves the utilization efficiency of the device, and reduces power consumption. According to the integrated composite overload injection system of the present invention, the occupied area and space of the device are greatly reduced, the dispersing, dissolving and ripening time of preparing the intelligent energy-gathered oil-displacing agent is greatly shortened, and the injection efficiency is improved.

In a specific embodiment of the present invention, as shown in FIG. 3, the composite overload mechanism 4 comprises a stator barrel 401 and a rotor 402, the mandrel 4021 of the rotor 402 is hermetically supported in the stator barrel 401 by the first bearing seats 408 at both ends, an impeller set 406 and an overload bed 407 are provided on the mandrel, a spacer ring 405 for sealing isolation is provided in the middle of the stator barrel 401, the spacer ring 405 isolates the impeller set 406 and the overload bed 407 and divides the stator barrel 401 into a stirring chamber 403 and an overload chamber 404, and the inner wall of the stator barrel 401 in the stirring chamber 403 is provided with a baffle ring and a baffle plate for water hammer. The stator barrel 401 is provided with the input port 4011 for feeding on the side wall 4031 of the stirring chamber 403, and the stator barrel 401 is provided with the output port 4012 for discharging on the side wall 4041 of the overload chamber 404. The mandrel is provided with a mandrel communication hole group 409 for connecting the stirring chamber 403 and the overload chamber 404 at one end of the stator barrel 401, and one end of the mandrel protruding out of the stator barrel 401 is the first power shaft.

Specifically, as shown in FIG. 3, an annular groove 4081 is provided in the middle of the first bearing seat outside the stirring chamber 403, the input port 4011 corresponds to the annular groove, and the bottom of the annular groove is provided with low-pressure area input holes 4082 toward the stirring chamber 403.

Through the composite overload mechanism 4 mainly consisted of the stator barrel 401 and the rotor 402, the injected water source is mixed with an intelligent energy-gathered oil-displacing agent into mixed solution in the jet tube. The mixed solution enters into the stirring chamber 403 through the input port 4011 and is stirred by the impeller set 406 at a high speed, and then enters into the overload chamber 404 through the mandrel communication hole group for overload quick-dissolving, ripening and filtering by the overload bed 407. The multi-functional composite overload mechanism 4 is highly integrated, performing high-speed water hammer stirring, macro-mixing and micro-dissolving, molecular infiltrating, and ripening solution filtering. Compared with the prior art, the mechanism reduces the number of devices and the preparation processes, improves the preparation efficiency of mother solution, and is suitable for online real-time use. The annular groove and the low-pressure area input hole 4082 are provided, facilitating the introduction of the mixed solution introduced from the inlet port 4011 into the low-pressure area of the stirring chamber 403, which is capable of forming a negative pressure for suction feeding and saves the traditional way of feeding through the jet pump.

In a specific embodiment of the present invention, as shown in FIG. 2, the driving mechanism comprises a motor 5 and a transmission unit, the motor 5 is installed on the rack 11 and inputs power to the input end of the transmission unit, and two output ends of the transmission unit are connected to the power shafts of the composite overload mechanism 4 and the booster pump 9, respectively.

Specifically, as shown in FIG. 2, the transmission unit comprises a small wheel 6, an intermediate axle 7 and a large wheel 8. The small wheel 6 is connected with the power shaft of the composite overload mechanism 4 and the output shaft of the motor 5 in series and coaxially. A clutch may be provided between the power shaft of the composite overload mechanism 4 and the small wheel 6. The intermediate axle 7 is erected above the rack 11 through a second bearing seat 701, the small wheel 6 is connected to the first intermediate wheel 704 of the intermediate axle 7 through a first transmission member 702, the large wheel 8 is connected to the second intermediate wheel 705 of the intermediate axle 7 through a second transmission member 703, and the rotating shaft of the large wheel 8 is connected to the power shaft of the booster pump 9 through a coupling. Obviously, the transmission unit may also use a gearbox with two output ends, and the two output ends of the gearbox are connected to the power shaft of the composite overload mechanism 4 and the booster pump 9, respectively. All the above similar modifications fall within the protection scope of the present invention.

Specifically, as shown in FIG. 2, the transmission member specifically uses a transmission belt or a chain.

The transmission unit consists of the small wheel 6, the intermediate axle 7 and the large wheel 8 and is driven by the motor 5, and a single motor can be used to drive the composite overload mechanism 4 and the booster pump 9 at the same time, reducing equipment investment, improving the utilization rate of the motor, and saving installation space. At the same time, when the booster pump 9 uses a screw pump, more power is required to start. When the system starts, the clutch is disengaged, and the composite overload mechanism 4 does not start and load until the screw pump starts. Using the screw pump to start the standby power can drive the composite overload mechanism 4, reduce the installed power, improve the system energy utilization rate, improve the utilization rate of the motor, and improve the efficiency of the motor and the system at the same time, which not only reduces the installed power but also achieves a power saving effect.

In a specific embodiment of the present invention, as shown in FIG. 2, the booster pump 9 specifically uses a low-speed screw pump, because the inner wall of the stator rubber at the high-pressure end is largely deformed by high pressure, the rotor of the low-speed screw pump changes in diameter at the high and low pressure ends, and the diameter of the rotor of the high-pressure end that is easily damaged is slightly larger than the diameter of the rotor of the low-pressure end; the stator of the low-speed screw pump is connected in series in sections and connected by an external flange. In a specific embodiment, the rotating speed of the low-speed screw pump is 150 rpm; the displacement: 45-55 $m^3/d$; the rated pressure is 10-12 MPa; the number of stages is 35-40.

A low-speed screw pump is used. Using the round geometry of the screw pump rotor and the low-shear characteristics of the continuous motion chamber, the mother solution, which has been basically ripened, is further dissolved, ripened and pressurized; a low-speed screw pump changing in diameter at the high and low pressure ends is used so as to gradually pressurize the mother solution, and the diameter of the rotor at the high-pressure end is slightly larger, which increases the service life of the device; the stator of the low-speed screw pump is connected in series in sections, which is convenient for replacement and maintenance. The replaced stator can be recycled on the rotor with a larger diameter, saving equipment cost.

In a specific embodiment of the present invention, the mixer 10 specifically uses a static mixer. The static mixer is used to mix and dilute the incoming high-pressure water and high-pressure mother solution, and then inject it into the oil-water well.

According to the integrated composite overload injection system based on each of the above embodiments, the present invention further provides a working method of an integrated composite overload injection system, wherein the integrated composite overload injection system according to any one of the above embodiments is used in injection of an oil-water well, and the working steps comprise:

- a first step, in which the feeding mechanism introduces a water source and an intelligent energy-gathered oil-displacing agent for preliminary mixing according to the process ratio;
- a second step, in which the preliminary mixed liquid is sucked into the mixing chamber of the composite overload mechanism for water hammer stirring and mixing, and then enters into the overload chamber of the composite overload mechanism for overload quick-dissolving, ripening and filtering to form a high-viscosity and high-concentration mother solution, and the overload acceleration of the composite overload mechanism is >500 m/s$^2$;
- a third step, in which the mother solution is input to the inlet of the booster pump through a pipeline, and is transported and injected by the booster pump with low shear and high pressure to the mixer;
- a fourth step, in which the mixer mixes and dilutes the high-pressure dilution water and the high-pressure mother solution, and then injects it into the oil-water well.

Further, the composite overload mechanism and the booster pump are driven by two output ends of a set of driving mechanisms, and the power shaft of the booster pump using a low-speed screw pump has a rotating speed lower than that of the composite overload mechanism. The rotating speed of the rotor of the composite overload mechanism can be adjusted from 600 to 1000 r/Min, and the rotating speed of the rotor of the low-speed screw pump is from 140 to 160 r/Min.

The present invention provides an integrated composite overload injection system. The core device composite overload mechanism 4 is provided, reducing from a total number of more than one hundred square of four dispersing and ripening tanks to the reactor of less than one square, in which the volume is reduced by more than one hundred times, the dissolving and ripening speed is shortened from 18 to 24 hours to less than 10 minutes, and the efficiency can be improved by one hundred times. It can realize self-priming feeding, stirring, mixing, dissolving, overload ripening and filtering. The power shafts of the composite overload mechanism 4 and the booster pump 9 are both driven by a set of driving mechanisms, which reduces the number of driving devices, improves the utilization efficiency of the device, and reduces power consumption. According to the integrated composite overload injection system of the present invention, the occupied area and space of the device are greatly reduced, the dispersing, dissolving and ripening time of preparing the intelligent energy-gathered oil-displacing agent is greatly shortened, and the injection efficiency is improved. In addition, through the composite overload mechanism 4 mainly consisted of the stator barrel 401 and the rotor 402, the injected water source is mixed with an intelligent energy-gathered oil-displacing agent into mixed solution in the jet tube. The mixed solution enters into the stirring chamber 403 through the input port 4011 and is stirred by the impeller set 406 at a high speed, and then enters into the overload chamber 404 through the mandrel communication hole group for overload quick-dissolving, ripening and filtering by the overload bed 407. The multi-functional composite overload mechanism 4 is highly integrated, performing high-speed water hammer stirring, overload stirring and dissolving, overload bed on-line ripening, and ripening solution filtering. Compared with the prior art, the mechanism reduces the number of devices and the preparation processes, improves the preparation efficiency of mother solution, and is suitable for online real-time use. The annular groove and the low-pressure area input hole 602 are provided, facilitating the introduction of the mixed solution introduced from the inlet port 4011 into the low-pressure area of the stirring chamber 102, which is capable of forming a negative pressure for suction feeding and saves the traditional way of feeding through the jet pump. The transmission unit consists of the small wheel 6, the intermediate axle 7 and the large wheel 8 and is driven by the motor 5, and a single motor can be used to drive the composite overload mechanism 4 and the booster pump 9 at the same time, reducing equipment investment, improving the utilization efficiency of the motor, and saving installation space. A low-speed screw pump is used. Using the round geometry of the screw pump rotor and the low-shear characteristics of the continuous motion chamber, the mother solution, which has been basically ripened, is further dissolved, ripened and pressurized; a low-speed screw pump changing in diameter at the high and low pressure ends is used so as to gradually pressurize the mother solution, which increases the service life of the device; the stator of the low-speed screw pump is connected in series in sections, which is convenient for replacement and maintenance. The replaced stator can be recycled on the rotor with a larger diameter, saving equipment cost.

The embodiments described above are only described with respect to the preferred modes of the present invention, rather than limit the scope of the present invention. Without departing from the design spirit of the present invention, various modifications and improvements made by those skilled in the art to the technical solutions of the present invention should fall within the scope of protection determined by the claims of the present invention.

What is claimed is:

1. An integrated composite overload injection system, comprising a feeding mechanism, a composite overload mechanism, a driving mechanism, a booster pump and a mixer, which are provided on a rack, wherein the feeding mechanism comprises a jet tube and is configured to preliminarily mixes water with a main agent and an auxiliary agent of an intelligent energy-gathered oil-displacing agent according to a ratio, an outlet of the feeding mechanism is communicated with an input port of the composite overload mechanism through a first pipeline, the composite overload mechanism is configured for stirring mixing dissolving, and overload ripening a preliminarily mixed solution to form a mother solution, the mother solution is input from an output port of the composite overload mechanism to an inlet of the booster pump through a second pipeline, the booster pump is configured for injecting the boosted mother solution into the mixer, the mixer is configuring for mixing the mother solution and the diluted high-pressure water to form a mixing solution and injecting the mixing solution into an oil-water well, and a first power shaft of the composite overload mechanism and a second power shaft of the booster pump are both driven by the driving mechanism, wherein the composite overload mechanism comprises a stator barrel and a rotor, a mandrel of the rotor is hermetically supported in the stator barrel by first bearing seats at both ends, an impeller set and an overload bed are provided on the mandrel, a spacer ring for sealing isolation is provided in a middle of stator barrel, the spacer ring isolates the impeller set and the overload bed and divides the stator barrel into a stirring chamber and an overload chamber; the stator barrel is provided with the input port for feeding on a side wall of the stirring chamber, the stator barrel is provided with output port for discharging on a side wall of the overload chamber, the mandrel is provided with mandrel communication hole group for connecting the stirring chamber and the overload chamber at one end of the stator barrel, and one end of the mandrel protruding out of the stator barrel is the first power shaft.

2. The integrated composite overload injection system according to claim 1, wherein an annular groove is provided in a middle of the first bearing seat outside the stirring chamber, the input port corresponds to the annular groove, and a bottom of the annular groove is provided with low-pressure area input holes toward the stirring chamber.

3. The integrated composite overload injection system according to claim 1, wherein the driving mechanism comprises a motor and a transmission unit, the motor is installed on the rack and inputs power to an input end of the transmission unit, and two output ends of the transmission unit are connected to the first power shaft of the composite overload mechanism and the second power shaft of the booster pump, respectively.

4. The integrated composite overload injection system according to claim 3, wherein the transmission unit comprises a small wheel, an intermediate axle and a large wheel, the small wheel is connected with the first power shaft of the composite overload mechanism and an output shaft of the motor in series and coaxially, the intermediate axle is erected above the rack through a second bearing seat, the small wheel is connected to a first intermediate wheel of the intermediate axle through a first transmission member, the large wheel is connected to a second intermediate wheel of the intermediate axle through a second transmission member, and a rotating shaft of the large wheel is connected to the second power shaft of the booster pump through a coupling.

5. The integrated composite overload injection system according to claim 4, wherein the first transmission member is a first transmission belt, and the second transmission member is a second transmission belt.

6. The integrated composite overload injection system according to claim 1, wherein the mixer is a static mixer.

7. A working method of an integrated composite overload injection system, wherein the integrated composite overload injection system according to claim 1 is used in injection of an oil-water well, and the working steps comprise:

- a first step, in which the feeding mechanism introduces a water source and an intelligent energy-gathered oil-displacing agent for preliminary mixing according to the process ratio;
- a second step, in which the preliminary mixed solution is sucked into the mixing chamber of the composite overload mechanism for water hammer stirring and mixing, and then enters into the overload chamber of the composite overload mechanism for overload quick-dissolving, ripening and filtering to form a high-viscosity and high-concentration mother solution;
- a third step, in which the mother solution is input to the inlet of the booster pump through the second pipeline, and is transported and injected by the booster pump with low shear and high pressure to the mixer;
- a fourth step, in which the mixer mixes and dilutes the high-pressure dilution water and the high-pressure mother solution, and then injects it into the oil-water well.

8. The integrated composite overload injection system according to claim 7, wherein the composite overload mechanism and the booster pump are driven by two output ends of a set of driving mechanisms, and the second power shaft; of the booster pump has a rotating speed lower than the first power shaft of the composite overload mechanism.

9. A working method of an integrated composite overload injection system, wherein the integrated composite overload injection system according to claim 2 is used in injection of an oil-water well, and the working steps comprise:

- a first step, in which the feeding mechanism introduces a water source and an intelligent energy-gathered oil-displacing agent for preliminary mixing according to the process ratio;
- a second step, in which the preliminary mixed solution is sucked into the mixing chamber of the composite overload mechanism for water hammer stirring and mixing, and then enters into the overload chamber of the composite overload mechanism for overload quick-dissolving, ripening and filtering to form a high-viscosity and high-concentration mother solution;
- a third step, in which the mother solution is input to the inlet of the booster pump through the second pipeline, and is transported and injected by the booster pump with low shear and high pressure to the mixer;
- a fourth step, in which the mixer mixes and dilutes the high-pressure dilution water and the high-pressure mother solution, and then injects it into the oil-water well.

10. The integrated composite overload injection system according to claim 9, wherein the composite overload mechanism and the booster pump are driven by two output ends of a set of driving mechanisms, and the second power shaft; of the booster pump has a rotating speed lower than the first power shaft of the composite overload mechanism.

11. A working method of an integrated composite overload injection system, wherein the integrated composite overload injection system according to claim 3 is used in injection of an oil-water well, and the working steps comprise:

- a first step, in which the feeding mechanism introduces a water source and an intelligent energy-gathered oil-displacing agent for preliminary mixing according to the process ratio;
- a second step, in which the preliminary mixed solution is sucked into the mixing chamber of the composite overload mechanism for water hammer stirring and mixing, and then enters into the overload chamber of the composite overload mechanism for overload quick-dissolving, ripening and filtering to form a high-viscosity and high-concentration mother solution;
- a third step, in which the mother solution is input to the inlet of the booster pump through the second pipeline, and is transported and injected by the booster pump with low shear and high pressure to the mixer;
- a fourth step, in which the mixer mixes and dilutes the high-pressure dilution water and the high-pressure mother solution, and then injects it into the oil-water well.

12. The integrated composite overload injection system according to claim 11, wherein the composite overload mechanism and the booster pump are driven by two output ends of a set of driving mechanisms, and the second power shaft; of the booster pump has a rotating speed lower than the first power shaft of the composite overload mechanism.

13. A working method of an integrated composite overload injection system, wherein the integrated composite overload injection system according to claim 4 is used in injection of an oil-water well, and the working steps comprise:

a first step, in which the feeding mechanism introduces a water source and an intelligent energy-gathered oil-displacing agent for preliminary mixing according to the process ratio;

a second step, in which the preliminary mixed solution is sucked into the mixing chamber of the composite overload mechanism for water hammer stirring and mixing, and then enters into the overload chamber of the composite overload mechanism for overload quick-dissolving, ripening and filtering to form a high-viscosity and high-concentration mother solution;

a third step, in which the mother solution is input to the inlet of the booster pump through the second pipeline, and is transported and injected by the booster pump with low shear and high pressure to the mixer;

a fourth step, in which the mixer mixes and dilutes the high-pressure dilution water and the high-pressure mother solution, and then injects it into the oil-water well.

14. A working method of an integrated composite overload injection system, wherein the integrated composite overload injection system according to claim 5 is used in injection of an oil-water well, and the working steps comprise:

a first step, in which the feeding mechanism introduces a water source and an intelligent energy-gathered oil-displacing agent for preliminary mixing according to the process ratio;

a second step, in which the preliminary mixed solution is sucked into the mixing chamber of the composite overload mechanism for water hammer stirring and mixing, and then enters into the overload chamber of the composite overload mechanism for overload quick-dissolving, ripening and filtering to form a high-viscosity and high-concentration mother solution;

a third step, in which the mother solution is input to the inlet of the booster pump through the second pipeline, and is transported and injected by the booster pump with low shear and high pressure to the mixer;

a fourth step, in which the mixer mixes and dilutes the high-pressure dilution water and the high-pressure mother solution, and then injects it into the oil-water well.

15. A working method of an integrated composite overload injection system, wherein the integrated composite overload injection system according to claim 6 is used in injection of an oil-water well, and the working steps comprise:

a first step, in which the feeding mechanism introduces a water source and an intelligent energy-gathered oil-displacing agent for preliminary mixing according to the process ratio;

a second step, in which the preliminary mixed solution is sucked into the mixing chamber of the composite overload mechanism for water hammer stirring and mixing, and then enters into the overload chamber of the composite overload mechanism for overload quick-dissolving, ripening and filtering to form a high-viscosity and high-concentration mother solution;

a third step, in which the mother solution is input to the inlet of the booster pump through the second pipeline, and is transported and injected by the booster pump with low shear and high pressure to the mixer;

a fourth step, in which the mixer mixes and dilutes the high-pressure dilution water and the high-pressure mother solution, and then injects it into the oil-water well.

* * * * *